United States Patent [19]

Gaudette et al.

[11] 4,093,987

[45] June 6, 1978

[54] HARDWARE CONTROL STORAGE AREA PROTECTION METHOD AND MEANS

[75] Inventors: Charles Henry Gaudette, Yorktown Heights; Raymond Charles Williams, Staatsburg, both of N.Y.

[73] Assignee: International Business Machines Corporation, Armonk, N.Y.

[21] Appl. No.: 780,937

[22] Filed: Mar. 24, 1977

[51] Int. Cl.² .......................... G06F 13/00; G06F 9/18
[52] U.S. Cl. ....................................................... 364/200
[58] Field of Search ............................... 364/200, 900

*Primary Examiner*—James D. Thomas
*Attorney, Agent, or Firm*—Bernard M. Goldman

[57] ABSTRACT

The embodiment provides a bit position in a system control register (CR) which is set to enable, and is reset to disable, the HCA protect means. An AND gate has an input which receives the enablement or disablement signal from the control register HCA protect bit position. The AND gate also receives the store requests from the processor, and further receives a signal common to all addresses in the HCA area such as all zeros for address bits 8 through 22 to signal the first 512 bytes in main storage which in current IBM S/370 machines contains the HCA, which is also called the program save area (PSA). The AND gate is normally disabled by the CR bit and provides an inverted output to a store request gate which normally provides store requests to the processor store access controls. Writing into the HCA is only permitted under special programmed conditions when the control register bit is set to disable the HCA protect means. Whenever the HCA protection is enabled, the AND gate is enabled to provide an HCA store violation signal, which actuates a protection interrupt code generator to generate a storage protect interrupt code in the PSW (Program Status Word) that causes the processor to test each store request into the HCA. The CR protect bit is disabled before and enabled after each legitimate HCA change code in a system control program to form a window in the code.

9 Claims, 3 Drawing Figures

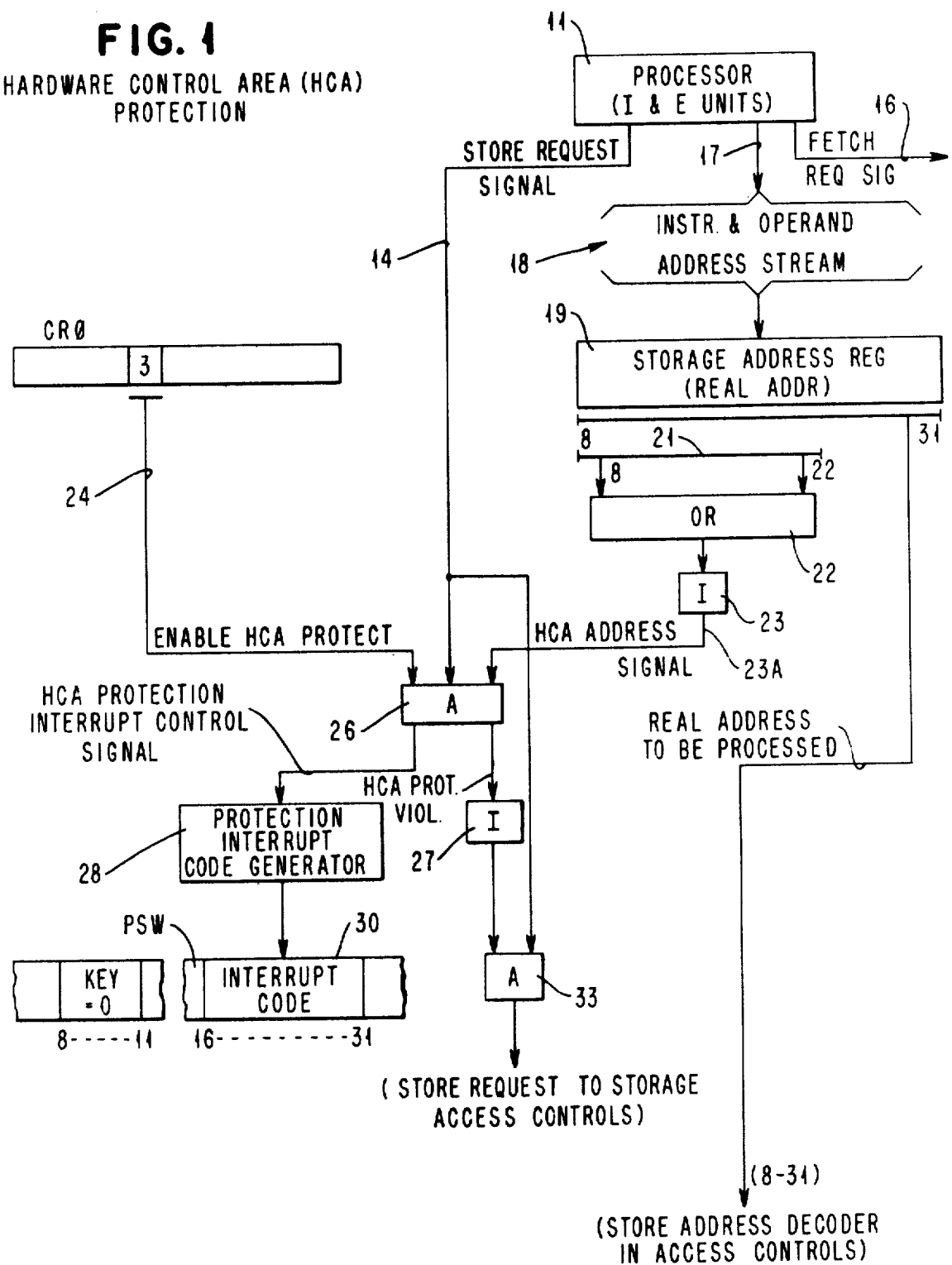

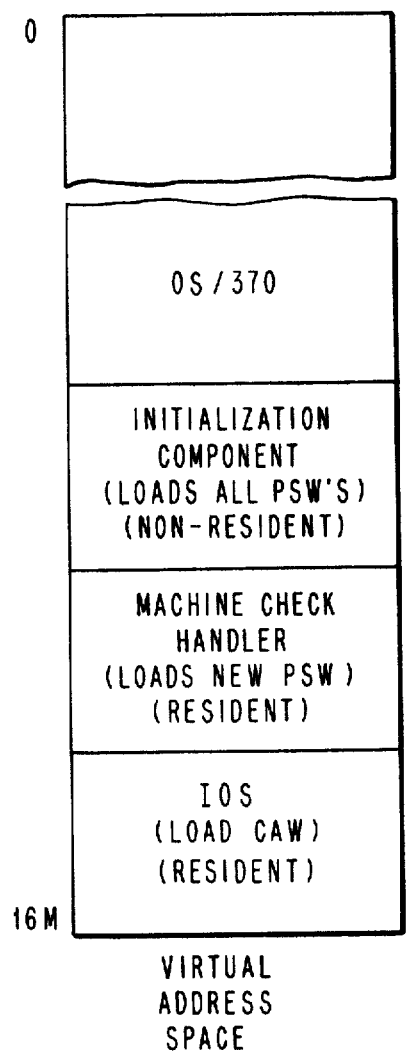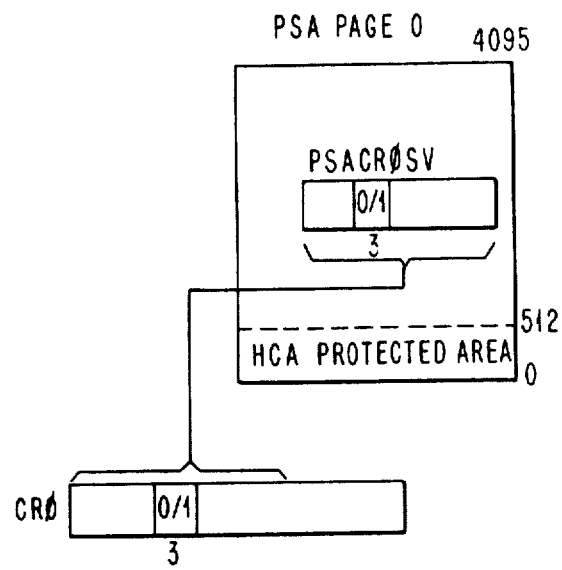

4,093,987

HARDWARE CONTROL STORAGE AREA PROTECTION METHOD AND MEANS

INTRODUCTION

This invention relates generally to the protection of a critical storage area in a data processing system from being adversely changed by addressing errors in system control programs operating in the same key area.

SUMMARY OF THE INVENTION

The invention provides a method and means in a data processing system for protecting a hardware control area (HCA) in main storage for a data processor from being erroneously changed by execution of programs in other storage areas assigned to the same protection key as the HCA.

It has been found that under the pragmatic conditions of modifying system control programs (SCP) in data processing machines that address errors unfortunately occur which adversely change the critical HCA area, and that such changes stop the machine operation and are extremely difficult to detect. It is the primary object of this invention to prevent such SCP addressing errors from adversely affecting machine operation.

The embodiment provides a bit position in a system control register (CR) which is set to enable, and is reset to disable, the HCA protect means. An AND gate has an input which receives the enablement or disablement signal from the control register HCA protect bit position. The AND gate also receives the store requests from the processor, and further receives a signal common to all addresses in the HCA area such as all zeros for address bits 8 through 22 to signal the first 512 bytes in main storage which in current IBM S/370 machines contains the HCA, which is also called the program save area (PSA). The AND gate is normally disabled by the CR bit and provides an inverted output to a store request gate which normally provides store requests to the processor store access controls. Writing into the HCA is only permitted under special programmed conditions when the control register bit is set to disable the HCA protect means. Whenever the HCA protection is enabled, the AND gate is enabled to provide a HCA store violation signal, which actuates a protection interrupt code generator to generate a storage protect interrupt code in the PSW (Program Status Word) that causes the processor to test each store request into the HCA.

Other objects, features and advantages of the present invention will become more apparent in the light of the following detailed description of a preferred embodiment thereof, as illustrated in the drawings.

BRIEF DESCRIPTION OF THE DRAWINGS

FIG. 1 illustrates hardware control area (HCA) protection circuits used by this invention.

FIG. 2 is representative of programs which are permitted to contain code that can store into the hardware control area (HCA).

FIG. 3 illustrates how the control register protect bit 3 is set to enabled or disabled state.

DESCRIPTION OF THE DETAILED EMBODIMENT

FIG. 1 illustrates circuitry for protecting the hardware save area (HCA), comprising byte real addresses 0 through 511. It contains a processor 11 having I and E units which generate store request signals on a line 14 and fetch request signals on a line 16. Executing instructions in processor 11 are represented by instruction stream 18 from which is derived addresses to be accessed in main storage, which are provided to a storage address register 19. These addresses are the real addresses applied to storage which are obtained as a result of translation in a system using logical addresses, or are derived directly from the instructions when there is no dynamic address translation, in the conventional manner for example done by a IBM System/370 Model 168 CPU. The invention controls only the HCA subset of addresses having store requests. The HCA addresses are sensed by an OR circuit 22 which senses high order bits 8 through 22 of the storage address register 19. An address is in the HCA whenever all of bits 8 through 22 are zero, and then an OR circuit 22 provides an output signal to an inverter 23. Its output 23A provides an HCA address signal to an AND gate 26, which also receives the store request signal on line 14.

The enablement and disablement of the HCA protection function is performed by the setting of bit 3 within control register O(CRO) in FIG. 1. Output line 24 conditions AND gate 26 when bit 3 is set to 1 state, and disables gate 26 when set to O state.

An inverter 27 receives the output signal from AND circuit 26 and inverts it to provide an input to a second AND gate 33 which also receives the store request signal line 14. If a store address is within the HCA area, line 23A and store request gate 26 conditions AND gate 26, which however will be blocked while the enable protect state is provided by bit 3 of CRφ on line 24 which then enables AND gate 33 to block any storage request to the processor storage access controls to prohibit the access.

The output signal from AND gate 26 is also provided to protection interrupt code generator 28 in the processor to generate a protect violation interruption code, which is put into the interrupt code 30 of the program status word (PSW) of the processor.

FIG. 3 illustrates how CR0 can be set or reset to enablement or disablement states from a PSACROSV address in real page 0 in main storage. It will be noted that this PSACROSV area is outside of the HCA protected area and therefore may be accessed without use of the controls shown in FIG. 1.

FIG. 2 illustrates in a general way the system control program well known as the IBM OS/370 system control program, which has only a very small amount of code (e.g. less than 1%) which can legitimately change the HCA. For example, the HCA can legitimately be changed by code for setting a new channel address word (CAW), or loading a new PSW.

The invention in controlled from within the system control program by recognizing only those parts of the code which are permitted to make a change into the HCA, and then immediately preceding each such HCA legitimate change code with a few instructions that set bit 3 to 0 (enablement state), and immediately following the HCA change code with a few instructions which resets bit 3 to 1 (disabled state) which is the normal state. As a result, well over 99 percent of the system control program is not able to store into the HCA. This bounded set of HCA enabled code is called a window.

Accordingly, if something goes wrong in the system control program in the 99+ percent of the code which is not permitted to change the HCA, and it attempts to make an HCA change, the change is prohibited and the HCA cannot be effected and its integrity is maintained. The following table illustrates how bit 3 of CR0 is set and reset within the system control program to form a few small windows within the SCP capable of legitimately storing into the HCA.

TABLE

INSTRUCTION STREAM

⋮

| | | |
|---|---|---|
| | STCTL 0,0,PSACR$\phi$SY | Store CR$\phi$ into location PSACR$\phi$SV in HCA (Bit 3 is 1). |
| CR$\phi$ Bit 3 Disable Operation | NI PSACR$\phi$SV, 11101111 | Sets Bit 3 to 0 (off state) in location PSACR$\phi$SV. |
| | LCTL 0,0,PSACR$\phi$SV | Load CR$\phi$ with Bit 3 in off state. |
| Store HCA Window | Instructions which store one or more values in HCA, e.g. store new PSW, CAW, etc. | |
| CR$\phi$ Bit 3 Enable Operation | OI PSACR$\phi$SV, 00010000 | Sets Bit 3 to 1 (on state) in location PSACR$\phi$SV. |
| | LCTL 0,0,PSACR$\phi$SV | Load CR$\phi$ with Bit 3 in on state. |

⋮

Although the invention has been shown and described with respect to a preferred embodiment thereof, it should be understood by those skilled in the art that various changes and omissions in the form and details of the invention may be made therein without departing from the spirit and the scope of the invention, which is to be limited only as set forth in the following claims.

What is claimed is:

1. A system for protecting a hardware control area (HCA) in main storage from being erroneously changed by execution of programs in other storage areas assigned to the same protection key as the HCA, in which the programs are segregated into segment windows permitted to store into the HCA, and all program segments outside the windows being prohibited from storing into the HCA, the system comprising a HCA protection field in a system control register, the field being set to an on state to output a HCA protect state signal which prevents store accesses into the HCA, means for providing an address stream for the main storage, detecting means receiving the address stream to detect real addresses for accessing the HCA and generating a HCA access control signal for each detected HCA address, means for generating a store modify signal for each address making a store access request to the main storage, first logic circuitry having inputs including: the HCA protect state signal, the HCA access control signal, and the store modify signal; an output of the first logic circuitry providing a HCA protection interrupt control signal when all the inputs are on, and means for connecting the HCA protection interrupt control signal to processor interrupt circuits to interrupt a current program providing a HCA address responsible for generating a HCA protection interrupt control signal.

2. A system as defined in claim 1, further comprising the first logic circuitry also having an output providing an access suppression signal when all inputs are on, access suppression circuitry having inputs connected to the access suppression signal and to the address stream, the access suppression circuitry blocking any address in the address stream from accessing the HCA when the access suppression signal is on, whereby no storage access can occur in the HCA for any address issued while the HCA protection field is set to an on state in the system control register.

3. A system as defined in claim 1, in which the detecting means further comprises second logic circuitry including: means for selecting a set of all high-order bit signals having a same setting for all HCA addresses in the address stream, and a zero-bit detector for detecting the zero state of the bits in the set, an output of the second logic circuitry providing HCA access control signals, a HCA access control signal being generated by the second logic circuitry to indicate a HCA address if all bit signals in the set have the above-stated same setting, and to indicate no HCA address if any one or more of the bit signals in the set do not have the above-stated same setting.

4. A system as defined in claim 3, in which the set of high-order bit signals consists of signals for bit positions eight through twenty-two in each real address consisting of bit positions eight through thirty-one, and the same setting for all HCA addresses is a zero-level signal for each of bit positions eight through twenty-two.

5. A method in a data processing system for protecting a hardware control area (HCA) in main storage from being erroneously changed by execution of programs in other storage areas assigned to the same protection key as the HCA, in which the programs are segregated into segment windows permitted to store into the HCA, and all program segments outside the windows being prohibited from storing into the HCA, the method comprising providing a HCA protection field in a system control register, setting the field to an on state which outputs a HCA protect state signal to normally prevent store accesses into the HCA, sensing an address stream to the main storage to detect addresses for the HCA, and generating a HCA access control signal for each detected HCA address, indicating a store modify signal for each address making a store access request to the main storage, inputting to first logic circuitry the HCA protect state signal, the HCA access control signal, and the store modify signal, outputting a HCA protection interrupt control signal from the first logic circuitry when all the input signals are on, and sending the HCA protection interrupt control signal to processor interrupt circuits to interrupt a current program providing a HCA address responsible for generating a HCA protection interrupt control signal.

6. A method as defined in claim 5, further compising
also outputting from the first logic circuitry an access suppression signal when all of the signals provided by the inputting step are on, transmitting to access suppression circuitry the access suppression signal and each address in the address stream, blocking any address in the access suppression circuitry when the access suppression signal is on, whereby no storage access can occur in the HCA for any address issued while the HCA protection field is set to an on state in the system control register.

7. A method as defined in claim 6, further comprising, setting off the HCA protection field in the system control register prior to or immediately upon entering a segment window, executing the segment window including making at least one store access into the HCA, the first logic circuit not generating any HCA protection interrupt control signal during execution of the segment window due to the off setting of the HCA protection field, and setting on the HCA protection field at the end of the segment window to prohibit any subsequent store accesses into the HCA until a next segment window is to be entered, whereby the access suppression circuitry does not block any HCA address making a store access during execution of the segment window.

8. A method as defined in claim 5, the sensing step further comprising inputting to second logic circuitry a set of fifteen high-order bit signals for each address in the address stream, outputting HCA access control signals from the second logic circuitry, a HCA access control signal being generated in the second logic circuitry to indicate a HCA address if all fifteen bit signals are zero-level signals, and to indicate no HCA address if any one or more of the fifteen bit signals is a one-level signal.

9. A method as defined in claim 8, further comprising implementing a load control instruction for initializing the HCA protection field in the system control register to an on state for all programs assigned to a zero protection key, implementing another load control instruction to tset the HCA protection field to an off state at the beginning of each segment window, and implementing still another load control instruction for returning the HCA protection field to an on state at the end of each segment window.

* * * * *